(12) United States Patent
Nazarko et al.

(10) Patent No.: US 8,728,201 B2
(45) Date of Patent: May 20, 2014

(54) APPARATUS AND METHOD FOR REMOVING CARBON DIOXIDE ($CO_2$) FROM THE FLUE GAS OF A FURNACE AFTER THE ENERGY CONVERSION

(75) Inventors: Jewgeni Nazarko, Dueren (DE); Ernst Riensche, Juelich (DE); Martin Bram, Juelich (DE); Li Zhao, Juelich (DE)

(73) Assignee: Forshungszentrum Juelich GmbH, Juelich (DE)

( * ) Notice: Subject to any disclaimer, the term of this patent is extended or adjusted under 35 U.S.C. 154(b) by 194 days.

(21) Appl. No.: 13/138,783

(22) PCT Filed: Mar. 19, 2010

(86) PCT No.: PCT/DE2010/000322
§ 371 (c)(1),
(2), (4) Date: Dec. 6, 2011

(87) PCT Pub. No.: WO2010/111996
PCT Pub. Date: Oct. 7, 2010

(65) Prior Publication Data
US 2012/0111192 A1    May 10, 2012

(30) Foreign Application Priority Data
Apr. 2, 2009 (DE) .................. 10 2009 016 015

(51) Int. Cl.
*B01D 53/22* (2006.01)
(52) U.S. Cl.
USPC .............. 95/51; 95/43; 95/45; 96/4; 96/108; 96/143

(58) Field of Classification Search
USPC .................. 95/43, 45, 51; 96/4, 108, 143
See application file for complete search history.

(56) References Cited

U.S. PATENT DOCUMENTS

| | | | |
|---|---|---|---|
| 4,701,187 A | | 10/1987 | Choe et al. |
| 5,281,254 A | * | 1/1994 | Birbara et al. ............ 95/44 |
| 5,435,836 A | * | 7/1995 | Anand et al. ............. 95/45 |
| 5,647,227 A | * | 7/1997 | Lokhandwala .......... 62/624 |

(Continued)

FOREIGN PATENT DOCUMENTS

| | | |
|---|---|---|
| DE | 101 17 140 | 10/2002 |
| WO | WO 2006049610 A1 * | 5/2006 |

OTHER PUBLICATIONS

Bernhard Epp. Hans Fahlenkamp and Christina Stankewitz, Chemie Ingenieur Technik [Chemical Engineer Technology] 2008, 80, No. 10, pp. 1579-1582.

(Continued)

*Primary Examiner* — Jason M Greene
*Assistant Examiner* — Anthony Shumate
(74) *Attorney, Agent, or Firm* — Jordan and Hamburg LLP

(57) ABSTRACT

Carbon dioxide is separated from a flue gas produced in a combustion plant. Flue gas is supplied to a membrane unit having at least one membrane module provided with a membrane that is selective for $CO_2$. A portion of the $CO_2$ is separated from the flue gas in the module, producing a $CO_2$-enriched permeate. $CO_2$-depleted flue gas remaining on the retentate side of the module is supplied to at least one additional $CO_2$ separating unit and a portion of the $CO_2$ in the retentate is separated by an absorbent. The result is a reduction in energy consumption.

16 Claims, 1 Drawing Sheet

(56) References Cited

U.S. PATENT DOCUMENTS

| | | | |
|---|---|---|---|
| 6,165,253 A * | 12/2000 | Sirkar et al. | 96/6 |
| 8,016,923 B2 * | 9/2011 | Baker et al. | 96/4 |
| 8,246,718 B2 * | 8/2012 | Wijmans et al. | 95/51 |
| 8,388,732 B2 * | 3/2013 | Doong et al. | 95/45 |
| 8,535,638 B2 * | 9/2013 | Terrien et al. | 423/650 |
| 2008/0104938 A1 | 5/2008 | Finkenrath et al. | |
| 2008/0307968 A1 * | 12/2008 | Kang et al. | 95/199 |
| 2009/0013870 A1 | 1/2009 | Sorensen et al. | |
| 2009/0156875 A1 * | 6/2009 | Tomioka et al. | 585/802 |
| 2010/0263377 A1 * | 10/2010 | Meulenberg et al. | 60/645 |
| 2011/0107916 A1 * | 5/2011 | Inoue et al. | 96/242 |
| 2011/0162382 A1 * | 7/2011 | Riensche et al. | 60/781 |
| 2011/0268618 A1 * | 11/2011 | Finkenrath | 422/169 |
| 2012/0186446 A1 * | 7/2012 | Bara et al. | 95/44 |

OTHER PUBLICATIONS

G. Goettlicher (1999) Energetik der Kohlendioxidrueckhaltung in Kraftwerken [Energetics of carbon dioxide retention in power plants], Duesseldorf, VDI Verlag, pp. cover-200.

L. Zhao, E. Riensche, R. Menzer, L. Blum, D. Stolten (2008) A parametric study of $Co_2/N_2$ gas separation membrane processes for post-combustion capture, Journal of Membrane Science, 325, 284-294.

Favre et al: "Carbon dioxide recovery from post-combustion processes: Can gas permeation membranes compete with absorption?" Journal of Membrane Science, Elsevier Scientific Publ. Company. Amsterdam, NL LNKD-DOI: 10.1016/J. MEMSCI.2007.02.007, vol. 294, No. 1-2, Apr. 5, 2007, pp. 50-59, XP022021879 ISSN: 0376-7388 pp. 1-3; figure I.

* cited by examiner

APPARATUS AND METHOD FOR REMOVING CARBON DIOXIDE ($CO_2$) FROM THE FLUE GAS OF A FURNACE AFTER THE ENERGY CONVERSION

This has priority to 10 2009 016 015.9 and PCT/DE2010/000322

BACKGROUND OF THE INVENTION

The invention relates to methods for reducing $CO_2$ emissions from the waste gases of combustion plants, and particularly from flue gases of energy conversion plants, using a combination of methods. The invention further relates to devices suited for carrying out these methods.

PRIOR ART

One of the most significant sources of increases in atmospheric carbon dioxide concentration is the combustion of fossil fuels in combustion plants with the goal of converting energy. Thus, attempts have been undertaken to separate $CO_2$ from the combustion of fossil fuels and thereafter store it, so as not to release it into the atmosphere. The reasons for these endeavors are the greenhouse effect and resulting global warming. At present, three basic approaches to separation of carbon dioxide are being pursued, which differ in the positioning of the separation step in the energy conversion process.

These approaches are $CO_2$ separation prior to energy conversion (pre-combustion), production of a flue gas rich in $CO_2$ by way of energy conversion in an enriched oxygen atmosphere (oxy-fuel), and $CO_2$ separation after energy conversion (post-combustion).

SUMMARY OF THE INVENTION

In the pre-combustion process, a fuel, such as coal for example, is freed of $CO_2$ even before the energy conversion. To this end, the fuel is gasified at a high temperature to form a synthesis gas made of carbon monoxide (CO) and hydrogen ($H_2$). In the oxy-fuel method, the fossil fuel is not burned in air, but ideally with pure oxygen.

As an end-of-pipe solution, the approach of $CO_2$ separation after energy conversion is advantageous in that the $CO_2$ separation step itself has little influence on the availability of the energy conversion plant. Moreover, it allows for retrofitting of existing plants. Depending on the type of power plant, type of fuel, and type of combustion of the energy conversion plant, the flue gas that is released into the atmosphere contains between 3 and 15% by volume $CO_2$.

A variety of methods can be employed to separate $CO_2$ from flue gas, for example chemical or physical absorption in absorption towers or in membrane contactors, or a $CO_2$-selective membrane.

$CO_2$ scrubbing by means of chemical absorption (CAS=chemical absorption system) is carried out as follows. Following flue gas scrubbing (for example, in the case of a coal-fired power station, consisting of nitrogen oxide reduction, dedusting and desulfurization), the flue gas is conducted through an absorbent, which is typically liquid. This absorbent generally contains amines. The $CO_2$ can first be chemically or physically bound in the scrubbing agent (absorption). Subsequently, the $CO_2$-loaded absorbent is heated, whereby the $CO_2$ is again separated from the amines (desorption). The released $CO_2$ is substantially pure and can subsequently be compressed, and optionally transported to a storage unit or for use. The amine-containing absorbent can be reused after the $CO_2$ has been released, and optionally after conditioning. For low to moderate $CO_2$ partial pressures, a degree of separation of up to 90% can thus be reached.

Regenerating the absorbent, however, is an energy-consuming process because, on one hand, the $CO_2$-loaded absorbent is heated and, on the other hand, the exothermic reaction, during the absorption, between the absorbent and the $CO_2$, is reversed by the supply of heat. The necessary heat, which is withdrawn from the power plant process, generally disadvantageously impacts the efficiency of the power plant.

In addition to amine solutions, other absorbents are also being tested at present. The scrubbing agent with the lowest energy expenditure will prevail.

As an alternative to chemical absorption scrubbing, separation by means of membrane contactors serving as the gas-liquid contact apparatus is presently being explored (MAS=membrane absorption system). Membrane contactors advantageously enable a dispersion-free mass transfer between two phases, and generally require only one tenth of the structural dimensions as compared to conventional chemical scrubbers.

In the membrane contactor, the gas and liquid flows are always separated from each other by the membrane surface. Multiple hollow membrane fibers are embedded in the housing of the contactor, with the flue gas flowing through the interior and the scrubbing liquid flowing in reverse flow in the outer fiber space. Because the membrane fibers that are used are made of polypropylene and are therefore hydrophobic, the membrane pores are wetted by the gas phase. This means that the membrane material comes in contact with the liquid phase only on the membrane surface. The mass transport of the carbon dioxide takes place based on diffusion through the membrane pores. The selectivity is determined by the solubility of the respective gas in the scrubbing liquid. The advantage of a membrane contactor is the large volume-related mass transfer surface area, which is a multiple of the mass transfer surface area of conventional contact apparatuses [1].

As an alternative to chemical absorption, $CO_2$ separation by means of selective $CO_2$ membranes is also being considered for post-combustion processes. For this purpose, polymer membranes, such as mixtures made of polyvinyl alcohols (PVA) and polyvinylamines (PVAm), for example, or organic-inorganic hybrid membranes as well as ceramic membranes, are being developed to separate $CO_2$ and $N_2$ at temperatures up to 200° C. Currently, a plastic membrane is also being explored, in which the membrane not only acts as a filter, but also guides the $CO_2$ in the form of bicarbonate through the membrane using a solvent that is fixed to the membrane.

The disadvantage in the aforementioned examples, however, is that, in the case of chemical absorption, the energy expenditure, in the form of steam withdrawn from the low-pressure steam turbine, for regenerating the absorbent results in a significant decrease in the gross and net electrical efficiency of the power plant, depending on the power plant and the decarbonization plant. According to [2], this decrease can amount to as much as 15 percentage points of the electrical power of a coal-fired power plant.

In the case of $CO_2$ separation by means of a membrane, in particular a ceramic membrane, the energy expenditure for assuring the driving force that is required for the $CO_2$ transport through the membrane results in a considerable decrease in the net electrical efficiency of the power plant. Moreover, the degree of $CO_2$ separation is significantly less than 90% at the defined $CO_2$ purity level, depending on the membrane selectivity. For example, at a $CO_2/N_2$ selectivity of 40:1 and a $CO_2$ purity of 80% by volume, the $CO_2$ separation of a single-stage polymer membrane is only 50% [3].

Problem and Solution

It is an object of the invention to provide a method which allows for an effective reduction of $CO_2$ emissions from the waste gases of combustion plants in a simple and cost-effective manner. It is a further object of the invention to provide a suitable device for performing the method mentioned above.

The invention relates to a method for reducing $CO_2$ emissions from the waste gases of combustion plants, and particularly from flue gases of energy conversion plants, using a combination of methods comprising $CO_2$-selective membranes and chemical absorption. For this purpose, the method according to the invention comprises the characteristics of claim 1.

The invention further relates to a device that is suitable for performing this method and that is apparent from the characteristics of the independent claims.

Hereafter, a combustion plant shall be understood as any plant in which a gaseous, liquid and/or solid fuel is oxidized so as to use the heat generated. These include, for example, gas burners operated with natural gas, liquefied petroleum gas, city gas, or landfill gas, oil burners operated, for example, with crude oil, heating oil or alcohols, as well as grate firing for clumped fuels, such as gassy coal or wood chips, fluidized bed combustion processes or coal dust firing.

The gaseous combustion product that develops during the industrial combustion of fuels is referred to as flue gas. Flue gases generally comprise solid, liquid and/or gaseous impurities such as, for example, nitrogen, carbon dioxide, sulfur dioxide, nitrogen oxide and water vapor in the form of gases, solid particles such as fly ash and soot, and optionally carbon monoxide or hydrogen.

The idea of the invention is based on performing $CO_2$ separation that is improved and more effective as compared to the prior art, during energy conversion, by combining a $CO_2$-selective membrane and an additional $CO_2$ separation step, for example chemical absorption.

According to the invention, in a first step, partial $CO_2$ separation is carried out by way of a $CO_2$-selective membrane, or a $CO_2$-selective membrane module, which hereafter is also referred to as a membrane unit. For this purpose, the manner in which the $CO_2$ partial pressure difference is generated is immaterial or variable within wide ranges (pressure on the feed side, vacuum on the permeate side, flushing medium, or a combination of two or more of these options). The enriched $CO_2$ is captured on the permeate side of the membrane module. The concentration of $CO_2$ in the permeate is usually higher than in the flue gas (feed) that is supplied to the membrane module. The waste gas from the membrane module (retentate) contains less $CO_2$ than before, so that the $CO_2$ partial pressure/$CO_2$ concentration is lower than on the feed side. In general, it is not difficult to achieve $CO_2$ depletion in the retentate of at least 30%, advantageously as much as at least 40%, and particularly advantageously as much as in excess of 50%, of the $CO_2$ starting concentration in the flue gas.

In the second step, the waste gas from the membrane module (retentate) is supplied to an additional $CO_2$ separation unit, which separates additional $CO_2$ from the waste gas. For this purpose, absorption and/or adsorption methods are notably suitable. If an absorption step follows, reference is made hereafter to a downstream absorption unit.

A characteristic of chemical and/or physical absorption is that the $CO_2$ concentration in the waste gas that is supplied, and which is to be treated, has no, or only little, influence on $CO_2$ separation from the supplied waste gas. The fact that some of the $CO_2$ was already separated by the preceding membrane module does not, therefore, negatively impact the effectiveness of this separation step in any way. If less $CO_2$ is separated in the absorption unit, advantageously less energy is required for the desorption of $CO_2$ and less absorbent is required in the absorption unit.

The basic idea of the present invention consists in suitably combining the advantages of both $CO_2$ separation methods so that effective, yet energy-saving, separation can be performed, which lowers the efficiency of the entire combustion plant only moderately. "Moderately" within the scope of the invention shall mean that, in total, no more than 10 percentage points of the electrical power of the power plant, and more particularly no more than 5 percentage points, is required for decarbonization.

The advantages of combining the methods of a $CO_2$-selective membrane (membrane unit) and an additional separation step, notably absorption (absorption unit), are summarized as follows:

1) lower total energy expenditure as compared to chemical absorption alone, at the same degree of $CO_2$ separation;
2) greater purity of enriched $CO_2$ at a high degree of separation as compared to a $CO_2$-selective membrane alone, with the same degree of separation;
3) decreased energy expenditure for regenerating the absorbent in the absorption unit when the waste heat from the membrane unit is utilized;
4) reductions in the amount of absorbent, the desorber and the peripheral systems of the absorption unit, as compared to chemical absorption alone, because the $CO_2$ flow to be separated is reduced as a result of the upstream membrane unit.

Separation by means of a $CO_2$-selective membrane is highly dependent on the driving force of the $CO_2$ diffusion through the membrane and generally decreases in terms of effectiveness with lower concentrations of $CO_2$ in the flue gas.

Separation by means of a selective membrane is thus used at a point at which it takes little effort, in terms of the production of the partial pressure difference, to separate a portion of the $CO_2$ from the flue gas. Additional $CO_2$ separation by means of a membrane could be achieved at this point only by way of a greater partial pressure difference, which would involve either large volume flows of flue gas, large quantities of flushing gas on the permeate side and/or particularly high complexity in the production of the partial pressure difference. Disadvantageously, all this could only be achieved with high energy expenditure. Moreover, at high degrees of separation, further $CO_2$ separation would lower the $CO_2$ purity in the product.

At this point, according to the invention, absorptive separation is thus provided downstream. This offers the advantage that the degree of $CO_2$ separation in this absorptive method step is substantially independent of the concentration of the supplied gas, but rather depends primarily on the parameters of the absorbent and the method. It is thus advantageously possible to remove additional $CO_2$ from the flue gas that has already been highly depleted of $CO_2$, using simple means. Because both the concentration of $CO_2$ and the absolute flue gas quantity are lower downstream of the membrane unit, than without such a membrane unit, the subsequent absorption can likewise advantageously be designed in a reduced manner. This reduces not only the quantity of the absorbent, but in particular the amount of energy required for desorption of the absorbed $CO_2$ from the scrubbing liquid.

This combined method according to the invention for $CO_2$ separation from the flue gas of a combustion plant thus advantageously makes it possible to achieve degrees of separation as high as 90%, without reducing efficiency by more than 8 percentage points as a result of this separation.

Within the scope of the invention, the membrane unit may comprise one or more membranes in any arbitrary interconnection. Moreover, the required driving force can be achieved by pressure on the feed side, a vacuum on the permeate side, flushing medium, or a corresponding combination of two or more of these options. Moreover, depending on the condition of the flue gas or of the enriched $CO_2$, the membrane unit may comprise additional components.

The combination of methods can advantageously be carried out in various positions in the existing flue gas scrubbing process along the flue gas duct. Advantageously, other flue gas scrubbing and conditioning methods may be provided between the two steps in the described combination of methods.

So as to produce the $CO_2$ flow in a defined quality, the $CO_2$ flows generated by means of the two method steps can advantageously be combined at various proportions.

DESCRIPTION OF THE PREFERRED EMBODIMENTS

The invention will be described in more detail hereafter with reference to exemplary embodiments, without thereby limiting the scope of protection. The person skilled in the relevant art will recognize analogous modifications as part of the invention.

Figure 1:
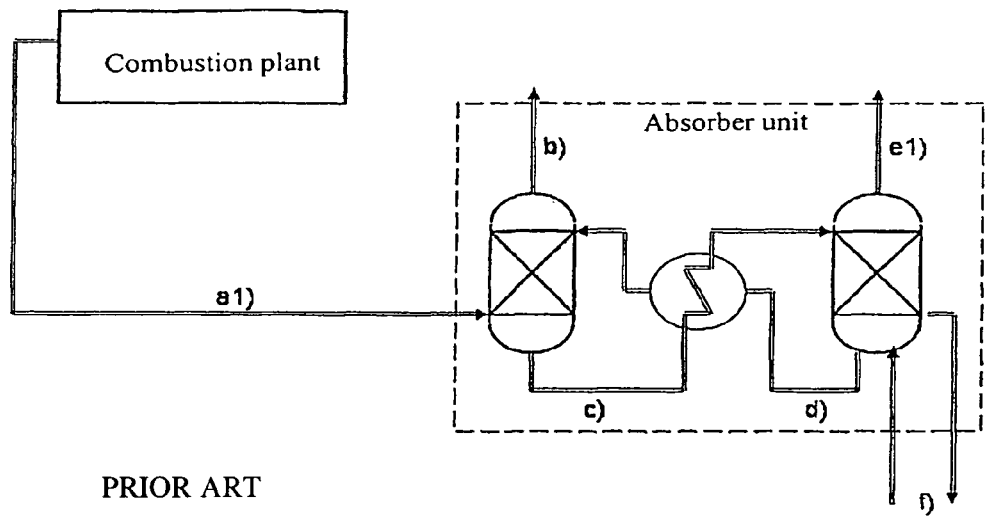
FIG. 1 is a diagram of an energy conversion process, which is an example of an energy generation process in a coal-fired power plant.
Figure 2:
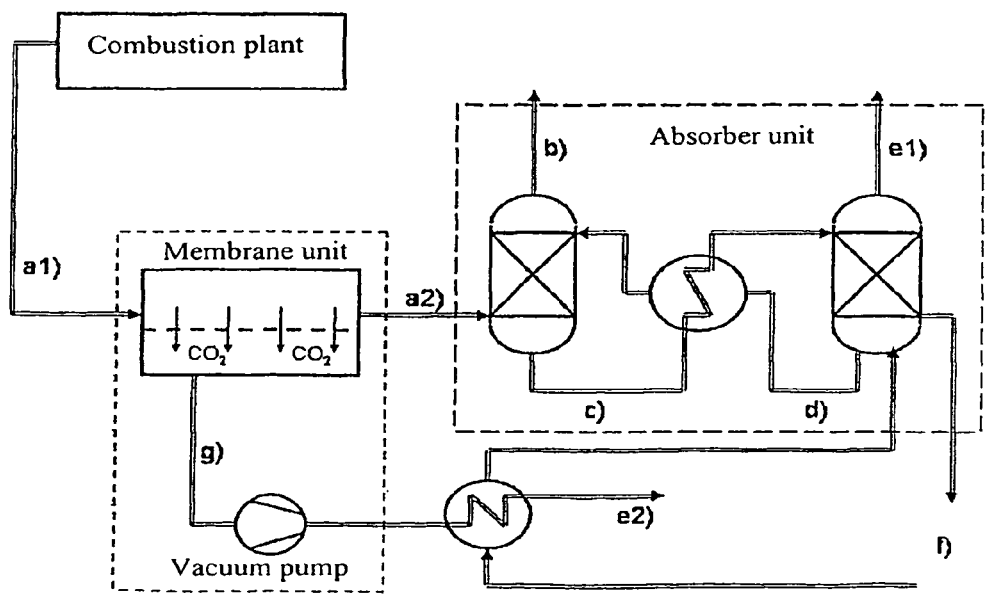
FIG. 2 is a diagram of an energy conversion process using the combination of methods according to the invention comprising the $CO_2$-selective membrane (membrane unit) and chemical scrubbing (absorber unit).

In FIGS. 1 and 2, the following meanings apply:
a1) flue gas,
a2) partially $CO_2$-depleted flue gas,
b) $CO_2$-depleted waste gas,
c) $CO_2$-enriched scrubbing liquid,
d) regenerated scrubbing liquid,
e1), e2) separated, gaseous $CO_2$,
f) cooling circuit for separated $CO_2$, or heating circuit for regenerating the absorbent,
g) $CO_2$-enriched permeate.

FIG. 1 shows a diagram of an energy conversion process, which is an example of an energy generation process in a coal-fired power plant comprising $CO_2$ separation from the flue gas (decarbonization) by means of chemical scrubbing (for example, 30% aqueous solution of monoethanolamine) subsequent to flue gas scrubbing according to the present state of the art. Flue gas scrubbing of a large-scale combustion plant fired with solid fuel, corresponding to the present state of the art, comprises nitrogen oxide reduction, dedusting, and desulfurization, in this order, in the case of a coal-fired heating.

Approximately 90% of the $CO_2$ contained in the flue gas (1a) is separated at a purity of 99% by volume (e1)) by chemical scrubbing. In a defined design, 6.3 percentage points of the electrical power of the coal-fired power plant is required to regenerate the absorbent, and for the electrical consumption of the decarbonization plant.

FIG. 2 shows a diagram of an energy conversion process using the combination of methods according to the invention comprising the $CO_2$-selective membrane (membrane unit) and chemical scrubbing (absorber unit).

Using the $CO_2$-selective polymer membrane having a $CO_2$/$N_2$ selectivity of 40:1, 50% of the $CO_2$ contained in the feed gas is separated in the membrane unit. The enriched $CO_2$ (g) has a purity of 80% by volume. In the example, the $CO_2$ partial pressure difference on the feed and permeate sides of the membrane is generated by means of a vacuum pump, the power requirement of which is approximately 2 percentage points of the electrical power of the coal-fired power plant.

Subsequently, the retentate (a2) from the membrane module is supplied to the $CO_2$-selective chemical scrubbing process (30% aqueous solution of monoethanolamine). By forming the chemical bonds between the monoethanolamine and $CO_2$ in the absorber, $CO_2$ is removed from the flue gas (b). After heating the $CO_2$-enriched, 30% aqueous solution of monoethanolamine by way of steam from the low-pressure turbine in the desorber, chemical bonds between the monoethanolamine and $CO_2$ are destroyed, so that the gaseous $CO_2$ (e1) can be captured and conditioned further. The depleted aqueous solution of monoethanolamine (d) is available again for subsequent use after conditioning. After conditioning the separated, gaseous $CO_2$, it has a purity of 99% by volume. It is assumed that 90% of the $CO_2$ that is supplied to chemical scrubbing is separated by means of the chemical scrubbing process. However, because the $CO_2$ mass flow separated by means of chemical scrubbing now accounts for less than half the $CO_2$ originally present in the flue gas, the regeneration of the absorbent and the electrical consumption of the decarbonization plant require approximately 3 percentage points of the electrical power of the coal-fired power plant. The entire energy requirement for decarbonization is now advantageously only 5 percentage points of the electrical power of the coal-fired power plant.

When using the waste heat of the vacuum pump in the absorption unit for regenerating the absorbent, the energy requirement of the absorption unit decreases to approximately 2.4 percentage points of the electrical power of the coal-fired power plant, so that the entire energy requirement for decarbonization is now only approximately 4.4% of the electrical power of the coal-fired power plant.

The enriched $CO_2$ from the membrane module (e2) can optionally be mixed with the $CO_2$ from the chemical scrubbing process (e1), so that, as a result of the entire $CO_2$ separation, 95% of the entire $CO_2$ is separated from the flue gas at a purity of approximately 90% by volume, which is sufficient for further transport and storage according to the literature. In total, a $CO_2$ separation degree of at least 80%, advantageously even 90%, and particularly advantageously more than 95%, of the $CO_2$ from the flue gas is possible.

Literature cited in this application:
[1] Bernhard Epp, Hans Fahlenkamp and Christina Stankewitz, Chemie Ingenieur Technik [Chemical Engineer Technology] 2008, 80, No. 10.
[2] G. Göttlicher (1999) Energetik der Kohlendioxidrückhaltung in Kraftwerken [Energetics of carbon dioxide retention in power plants], Düsseldorf, VDI Verlag.
[3] L. Zhao, E. Riensche, R. Menzer, L. Blum, D. Stolten (2008) A parametric study of $CO_2$/$N_2$ gas separation membrane processes for post-combustion capture, Journal of Membrane Science, 325, 284-294.

The invention claimed is:

1. A method for separating carbon dioxide from a flue gas generated in a combustion plant, comprising supplying the flue gas to a membrane unit comprising at least one membrane module having a $CO_2$-selective polymer membrane having a $CO_2/N_2$ selectivity of 40:1, whereby a portion of the $CO_2$ is separated in the module from the flue gas as enriched $CO_2$ permeate, and a remaining portion of the flue gas that is $CO_2$-depleted being retentate, supplying the retentate to at least one additional $CO_2$ separating unit, whereby a portion of the $CO_2$ in the retentate is separated from the flue gas by an absorbent.

2. The method according to claim 1, wherein a portion of the $CO_2$ is separated from the flue gas by a plurality of membrane modules, each having a $CO_2$-selective membrane.

3. A method according to claim 1, wherein a partial pressure difference is produced inside a membrane module either by pressure on the feed side, or by a vacuum on the permeate side, or by a flushing medium, or by the combination of two or more of these options.

4. A method according to claim 1, wherein the at least one additional $CO_2$ separating unit is an absorption scrubber or a membrane contactor.

5. A method according to claim 1, further comprising performing a multistage absorption in $CO_2$ separating units.

6. A method according to claim 1, wherein at least 30% by volume of the $CO_2$ is separated from the flue gas in the membrane unit.

7. A method according to claim 1, wherein at least 80% by volume the $CO_2$ is separated from the flue gas generated in the combustion plant through the combination of $CO_2$ separation in the membrane unit and the additional $CO_2$ separating unit.

8. A method according to claim 1, wherein more than 40% by volume of the $CO_2$ is separated from the flue gas in the membrane unit.

9. A method according to claim 1, wherein more than 50% by volume of the $CO_2$ is separated from the flue gas in the membrane unit.

10. A method according to claim 1, wherein at least 90% by volume of the $CO_2$ is separated from the flue gas generated in the combustion plant through the combination of $CO_2$ separation in the membrane unit and the additional $CO_2$ separating unit.

11. A method according to claim 1, wherein at least 95% by volume of the $CO_2$ is separated from the flue gas generated in the combustion plant through the combination of $CO_2$ separation in the membrane unit and the additional $CO_2$ separating unit.

12. A device for separating $CO_2$ from a flue gas, having a membrane unit, comprising at least one membrane module having a $CO_2$-selective polymer membrane having a $CO_2/N_2$ selectivity of 40:1, and an additional $CO_2$ separating unit, comprising an absorbent.

13. A device according to claim 12, comprising a plurality of membrane modules, each having a $CO_2$-selective polymer membrane having a $CO_2/N_2$ selectivity of 40:1.

14. A device according to claim 12, a wherein the additional $CO_2$ separating unit comprises a means for regenerating an absorbent.

15. A device according to claim 14, wherein a heat exchanger is disposed between the membrane module and the means for regenerating the absorbent.

16. A device according to claim 12, further comprising a means for combining the $CO_2$ obtained from the from the membrane unit and the additional $CO_2$ separating unit.

* * * * *